United States Patent [19]

Yasui

[11] Patent Number: 5,529,388
[45] Date of Patent: Jun. 25, 1996

[54] HYDROSTATIC ANTILOCK BRAKE SYSTEM

[75] Inventor: Yoshiyuki Yasui, Davis, Calif.

[73] Assignee: IMRA America, Inc., Ann Arbor, Mich.

[21] Appl. No.: 475,819

[22] Filed: Jun. 7, 1995

Related U.S. Application Data

[63] Continuation of Ser. No. 944,254, Sep. 14, 1992, abandoned.

[51] Int. Cl.$^6$ ................................................. B60T 8/40
[52] U.S. Cl. ................................ 303/116.1; 303/115.2
[58] Field of Search ......................... 303/113.1, 100, 303/115.4, 115.5, 116.1, 116.2, 116.4, 119.1, 171, 177, 178, 179; 180/197

[56] References Cited

U.S. PATENT DOCUMENTS

| | | | |
|---|---|---|---|
| 3,499,689 | 3/1970 | Carp et al. | 303/21 |
| 3,637,264 | 1/1972 | Leiber et al. | 303/20 |
| 4,585,281 | 4/1986 | Schnürer | 303/116.6 |
| 4,603,920 | 8/1986 | Otsuki et al. | 303/10 |
| 4,729,611 | 3/1988 | Kircher et al. | 303/116.1 |
| 4,826,258 | 5/1989 | Ocvirk et al. | 303/113.2 |
| 4,842,343 | 6/1989 | Akiyoshi et al. | 303/103 |
| 4,927,213 | 5/1990 | Burgdore | 303/116.1 |
| 4,986,614 | 1/1991 | Ricker et al. | 303/115.2 |
| 4,989,925 | 2/1991 | Kohno | 303/116.2 |
| 5,000,523 | 3/1991 | Mikhaeil-Boules et al. | 303/115.2 |
| 5,011,237 | 4/1991 | Matouka et al. | 303/115.2 |
| 5,026,125 | 6/1991 | Matouka et al. | 303/115.2 X |
| 5,029,950 | 7/1991 | Vennemeyer et al. | 303/115.2 X |
| 5,039,175 | 8/1991 | Holzmann et al. | 303/92 |
| 5,040,854 | 8/1991 | Arikawa | 303/116.1 |
| 5,071,202 | 12/1991 | Fabris et al. | 303/115.2 |
| 5,112,116 | 5/1992 | Mikhaeil-Boules et al. | 303/115.2 |
| 5,257,192 | 10/1993 | Masaki | 303/100 X |

OTHER PUBLICATIONS

"Road Testing of Wheel Slip control Systems in the Laboratory", by Edwin E. Stewart and Lauren L. Bowler, Paper No. 690215 presented Jan., 1969, pp. 5–13.
"Four Years of Experience with 4–Wheel Antiskid Brake Systems (ABS)", by Heinz Leiber and Armin Czinczel, Paper No. 830481 presented Feb., 1983, pp. 241–248.
"A New Anti–Skid–Brake System for Disc and Drum Brakes", by Heinrich Schurr and Adam Dittner, Paper No. 840468 presented Feb., 1984, pp. 289–301.
"Braking Equipment (Passenger Cars)", Automotive Handbook, Published by Robert Bosch GmbH, 1986, pp. 528–535.

*Primary Examiner*—Robert J. Oberleitner
*Assistant Examiner*—Peter M. Poon
*Attorney, Agent, or Firm*—Burns, Doane, Swecker & Mathis

[57] ABSTRACT

The present invention relates to an antilock brake system having an electrically controlled hydrostatic motor and pump system. The inventive ABS improves stability and maneuverability during braking by reducing or eliminating vibration and noise problems due to conventional on/off solenoid valve control. In accordance with exemplary embodiments, a two position solenoid is actuated (i.e., energized) in response to initiation of an ABS control mode. Once activated, the solenoid remains energized for the duration of the ABS control mode. Because the solenoid remains continuously activated during the ABS control mode, the vibration and noise associated with repeatedly activating and deactivating a solenoid is reduced or eliminated. To effect pressure increases and decreases in a braking channel during the ABS control mode, a reversible (i.e., bi-directional) pump is provided in each braking channel. To further enhance the smoothness of the braking, the reversible pump is controlled with an analog command signal that is, for example, proportional to a difference between wheel deceleration/acceleration detected for the channel and a vehicle's deceleration/acceleration.

17 Claims, 6 Drawing Sheets

HYDROSTATIC ANTILOCK BRAKE SYSTEM

This application is a continuation of application Ser. No. 07/944,254, filed Sep. 14, 1992, now abandoned.

BACKGROUND OF THE INVENTION

1. Field of the Invention

The present invention relates generally to antilock brake systems. More particularly, the present invention relates to an electrically controlled hydrostatic motor and pump system for an antilock brake system.

2. State of the Art

An antilock brake system (ABS) is a control system for regulating vehicle braking to prevent locking of wheels during braking. During ABS control, the stability or instability of individual wheel motion is monitored. For example, wheel rotation is kept in a slip range which provides maximum braking force by controlling a succession of pressure build-up, pressure reduction and pressure holding phases.

Typically, an ABS includes wheel-speed sensors that monitor the motion of each vehicle wheel. If one wheel shows signs of locking, a sharp rise in peripheral wheel deceleration and in wheel slip occurs. If these values exceed predetermined critical values, an ABS controller commands a solenoid-valve unit in the ABS to stop or reduce wheel-brake pressure build-up until the danger of lock-up has passed. Afterwards, the brake pressure is again built-up to ensure that the wheel is not underbraked. A typical ABS includes solenoid valves which are repeatedly turned on/off to effect the aforementioned pressure build-up, pressure reduction and pressure holding phases. This solenoid actuated on/off control technique results in significant vibration and noise problems.

For example, a known ABS system available from Bosch is described in the Bosch Automotive Handbook, 2nd edition, 1986. Pages 528 to 532 describe an ABS system which includes a 3-channel hydraulic modulator for front-rear split brake circuits. Each channel of the Bosch ABS includes a three position solenoid valve and a return pump which is driven by an electric drive motor. In a first de-energized position of the solenoid valve, there is an unhindered passage of hydraulic fluid from a master cylinder to a wheel-brake cylinder when a brake pedal is activated (e.g., depressed). In this solenoid valve position, the wheel-brake pressure rises during initial braking and during automatic brake control. In a second, semi-energized position of the solenoid valve, hydraulic fluid passage from the master cylinder to a wheel-brake cylinder is interrupted. In this second position, the wheel-brake pressure is kept constant. In a third fully energized position of the solenoid valve, the wheel-brake cylinder is connected to the return pump and a return hydraulic line to decrease wheel-brake pressure.

Thus, the aforementioned conventional ABS uses repetitive solenoid actuation to increase, hold or decrease pressure in a wheel braking cylinder. The actuation signal for the solenoid is an on/off signal having a square wave configuration (i.e., vertical rise and fall times during activation/deactivation of the solenoid).

Similarly, the actuation signal for the electric drive of the return pump is conventionally a square wave which is used to either activate or deactivate the pump when a pressure decrease is commanded. The return pump operates in a single direction to redirect brake fluid via dampers to the master cylinder when brake fluid is to be removed from a wheel-brake cylinder (i.e., to reduce pressure). Pressure reduction typically lasts about 20 ms while pressure buildup lasts about 200 ms.

The conventional ABS described above suffers significant drawbacks. As mentioned above, because each of these systems includes solenoid controlled on/off brake pressure actuation in conjunction with on/off pump control, substantial vibration and noise occurs during ABS brake actuation. Further, the use of square wave signals to repeatedly activate/deactivate the solenoids and the one-directional pumps during ABS control results in prolonged settling time (i.e., hysterisis) before a wheel being controlled attains a desired command speed during a braking maneuver (i.e., a speed which provides maximum braking force with optimum slip).

SUMMARY OF THE INVENTION

The present invention relates to an ABS having an electrically controlled hydrostatic motor and pump system. The inventive ABS has been developed to improve stability and maneuverability during braking, and to reduce or eliminate vibration and noise problems by providing smooth control of ABS brake actuation.

In accordance with exemplary embodiments, a two position solenoid is actuated (i.e., energized) in response to initiation of an ABS control mode. Once activated, the solenoid remains energized for the duration of the ABS control mode. Because the solenoid remains continuously activated during the ABS control mode, the vibration and noise associated with repeatedly activating and deactivating a solenoid is reduced or eliminated. To effect pressure increases and decreases in a braking channel during the ABS control mode, a reversible (i.e., bi-directional) pump is provided in each braking channel. To further enhance the smoothness of the braking, the reversible pump is controlled with an analog command signal that is, for example, proportional to a difference between wheel deceleration/acceleration detected for the channel and a vehicles deceleration/acceleration.

BRIEF DESCRIPTION OF THE DRAWINGS

Other objects and advantages of the present invention will become more apparent from the following detailed description of preferred embodiments when read in conjunction with the accompanying drawings wherein.

DETAILED DESCRIPTION OF THE PREFERRED EMBODIMENTS

Figure 1:
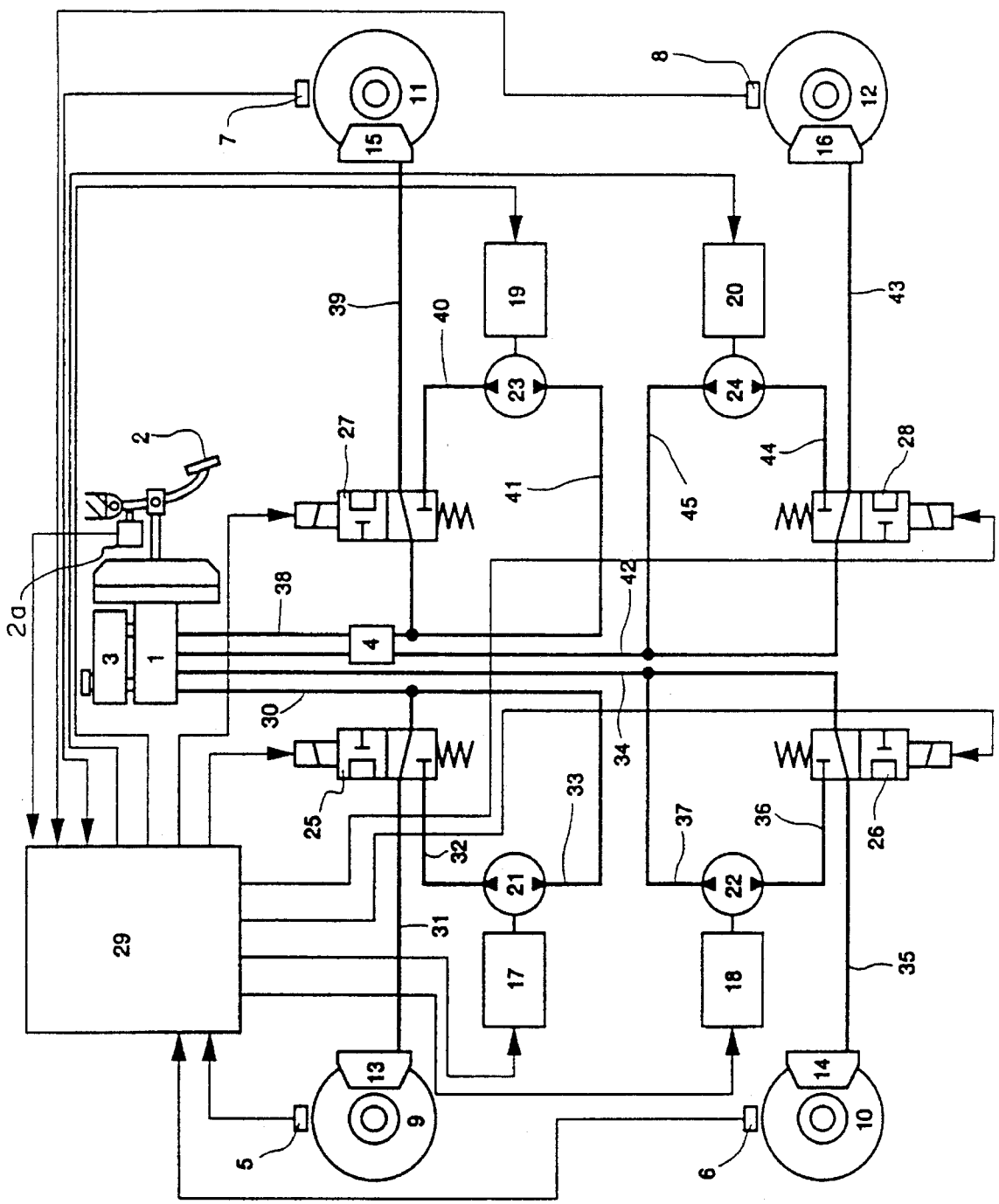
FIG. 1 is an exemplary embodiment of an ABS in accordance with the present invention.

The present invention relates to methods and devices for ABS control of a vehicle having at least one wheel. In an exemplary embodiment shown in FIG. 1, an ABS in accordance with the present invention is illustrated with respect to a four wheel vehicle having four braking channels. The ABS shown in FIG. 1 includes hydrostatic means for providing a braking force to at least one individual wheel in each braking channel, means for sensing wheel speed of the at least one individual vehicle wheel, and controller means for controlling the hydrostatic braking means in response to the sensing means.

The hydrostatic braking means includes a master cylinder 1 which responds to actuation of a brake pedal 2. An associated brake pedal sensor 2a detects actuation\deactuation of the brake pedal. The hydrostatic braking means also includes a fluid reservoir 3 (e.g., hydraulic fluid) associated with the master cylinder and a proportional valve 4. Wheel brake cylinders 13, 14, 15 and 16 are associated with each of four brake wheels (i.e., brake discs) 9, 10, 11 and 12, respectively. Reversible (i.e., bi-directional) electric DC motors 17, 18, 19 and 20 are provided for driving each of four reversible hydraulic fluid pumps 21, 22, 23 and 24 associated with each of the individual brake wheels.

Solenoid valves 25, 26, 27, and 28 are associated with each of the braking channels to connect various hydraulic lines between the pumps, the wheel cylinders and the master cylinder. For example, a first braking channel of FIG. 1 includes hydraulic lines 30, 31, 32 and 33 which are selectively interconnected. The hydraulic lines 30 and 31 connect the wheel cylinder 13 with master cylinder 1 when the solenoid 25 is in an unenergized state. The remaining three braking channels shown similarly include hydraulic lines 34, 35; 38, 39; and 42, 43, respectively.

The hydraulic line 32 in the first braking channel is used during a selective, serial connection between the hydraulic pump 21 and the wheel cylinder 13. Activation of solenoid 25 breaks the direct connection between hydraulic lines 30 and 31 (see FIG. 1), and interconnects hydraulic lines 31 and 32. The hydraulic lines in this braking channel are thus configured to increase pressure in the wheel cylinder 13 by pumping hydraulic fluid from the master cylinder 1 to the wheel cylinder 13 via motor 17 and pump 21 such that fluid flows from master cylinder 1 through hydraulic lines 30, 33, 32 and 31. The remaining three braking channels similarly include hydraulic lines 36, 37; 40, 41; and 44, 45, respectively serially connected with the pump present in a given channel.

Alternately, the hydraulic line configuration subsequent to solenoid activation can be used to decrease brake pressure in the wheel cylinder 13 of the first braking channel by reverse operation of the motor 17 and pump 21. In this case, hydraulic fluid is directed from the wheel cylinder 13 to the master cylinder 1 via a return path such that fluid flows from the wheel cylinder 13 through the hydraulic lines 31, 32, 33 and 30. The reconfigured hydraulic lines and reversible pumps included in each of the three remaining braking channels operate in similar fashion.

The wheel sensing means includes wheel speed sensors 5, 6, 7 and 8 placed at each of brake wheels 9, 10, 11 and 12, respectively. Signals from each of the wheel speed sensors are delivered to a controller means represented as controller 29. These signals are used in a manner similar to that described in U.S. Pat. No. 4,842,343, the disclosure of which is hereby incorporated by reference in its entirety.

Figure 2:
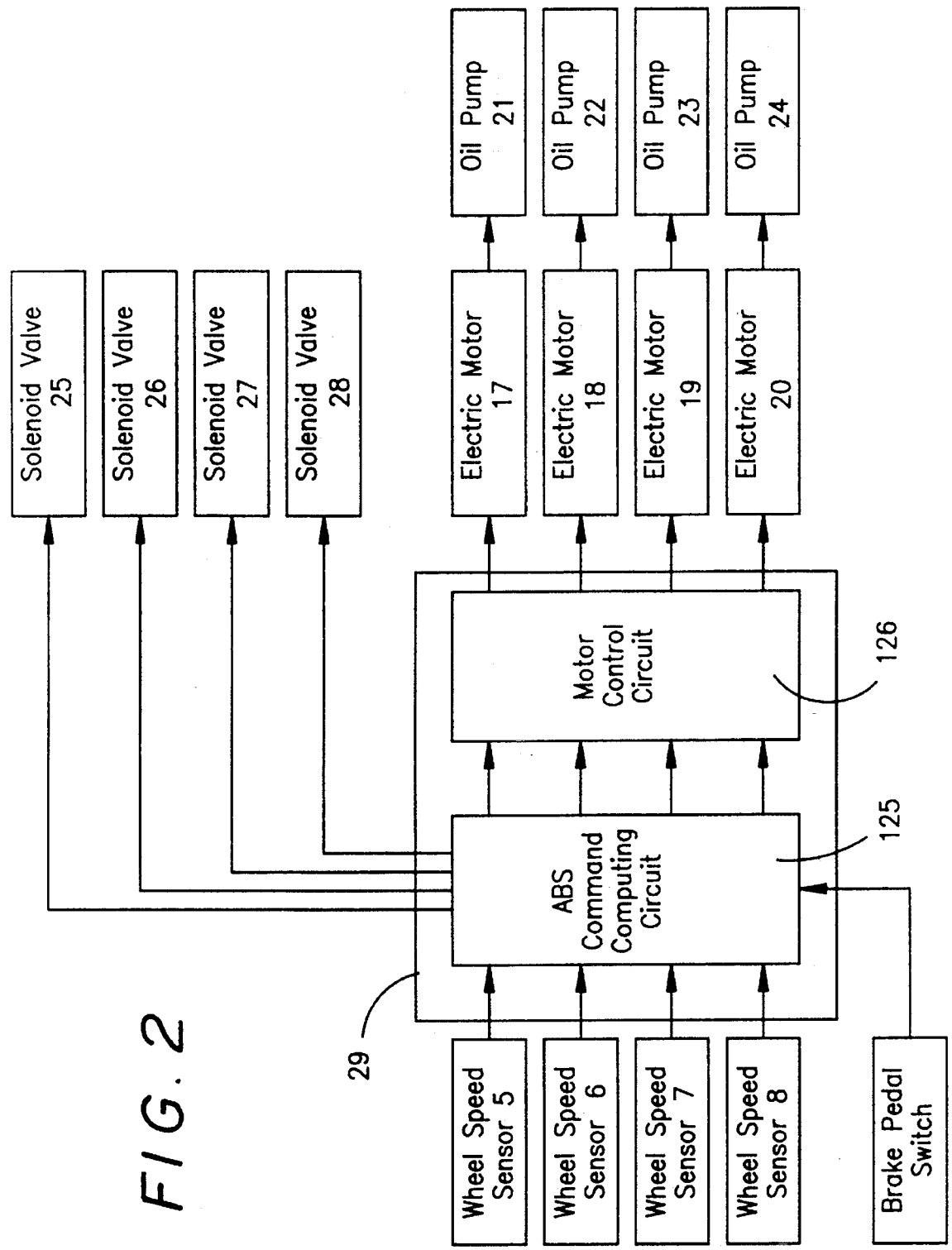
FIG. 2 is a more detailed illustration of the FIG. 1 controller.

As shown in FIG. 2 of the present application, the controller 29 includes an ABS command computing circuit 125 and a motor control circuit 126. The ABS command computing circuit 125 uses a conventional ABS algorithm to activate an ABS control mode, at which time a control signal is used to activate each of the four solenoid valves 25–28.

For example, an algorithm similar to that disclosed in the aforementioned U.S. Pat. No. 4,842,343, can be used to initiate the ABS control mode of the present invention. U.S. Pat. No. 4,842,343 relates to an ABS control system in which wheel acceleration/deceleration and wheel slip (i.e., difference between wheel speed and vehicle speed) are used to initiate an ABS control mode. Accordingly, when the wheel slip and wheel deceleration in a given channel of the FIG. 1 braking system exceed predetermined thresholds (e.g., thresholds less than those of U.S. Pat. No. 4,842,343), the solenoid in that braking channel is activated The solenoid remains continuously activated until the ABS control mode is ended. In the exemplary embodiments described herein, the ABS control mode is ended when the brake pedal sensor detects that the brake pedal has been released, or when the vehicle speed has been reduced to zero. Prior to activation of the ABS control mode, pressure increases in any or all of the braking channels are proportional to the force applied to the brake pedal. After initiation of the ABS control mode, pressure increases and decreases in a given braking channel are controlled by the hydraulic pump in that channel.

Once the ABS mode has been activated, any or all of the four solenoids shown in FIG. 1 of the present application remain energized for the duration of the ABS mode. In their energized state, the solenoids are extended to break the direct connection between the wheel brake cylinders and the master cylinder. That is, each of the solenoids are moved from their first position shown in FIG. 1 to a second position at which the hydraulic pumps are placed in series between the wheel brake cylinders and the master cylinder.

In addition to activating the FIG. 1 solenoids to initiate an ABS control mode, the ABS command computing circuit 125 further calculates command signals for the electric motor of each braking channel using a wheel speed reference command signal and input signals from the wheel speed sensors 5, 6, 7 and 8 during an ABS control mode. Thus, the present invention provides a much smoother and more stable ABS control. Pressure within each of the activated channels is controlled by reversibly driving the pump for each braking channel with a control signal. A pump command from controller 29 is proportional to a difference between a wheel deceleration/acceleration detected for the channel and a vehicle deceleration/acceleration. Alternately, a wheel speed error signal generated for that braking channel can be used to control the pump motor. In the latter case, the error signal corresponds to a difference between a sensed wheel velocity signal for the wheel located in the channel being controlled and a vehicle target velocity signal. The target velocity can be established similar to that of target velocity $V_o$ in FIG. 5 of the aforementioned U.S. Pat. No. 4,842,343.

The vehicle velocity signal can be generated in a number of ways. For example, in an exemplary embodiment, the vehicle velocity signal can be generated by averaging the wheel speed at each of the wheels of the vehicle. Alternately, the highest wheel velocity associated with the wheels of the vehicle can be used as an estimate of the vehicle velocity. When using compared acceleration/deceleration signals to control a braking channel pump, a derivative of the vehicle velocity, regardless of how it is detected, can be easily determined by the controller from the velocity signal and compared with a derivative of the wheel speed signal for each of the channels.

Because a control signal proportional to an error signal is used to drive a reversible hydraulic pump at a speed proportional to the error signal, a much smoother control of each channel is provided. Further, improved settling time of the wheel speed or deceleration to the command wheel speed or deceleration (i.e., much less hysterisis) is associated with the control.

Figure 6:
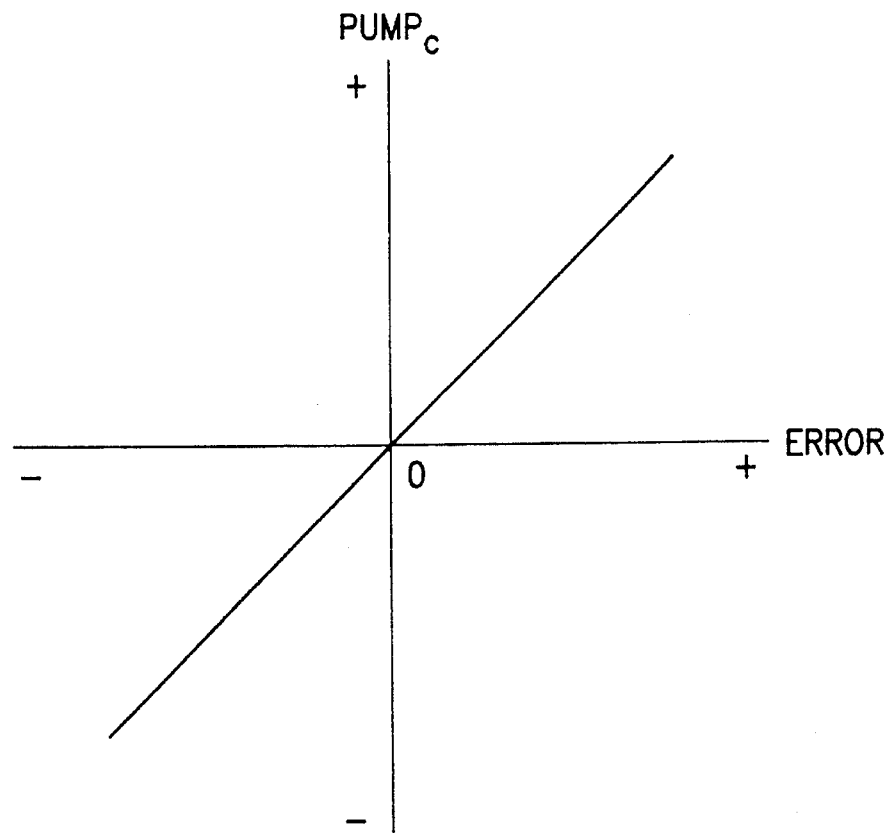
FIG. 6 is a graph showing a linear relationship between wheel speed error and a braking channel control signal.
Figure 7:
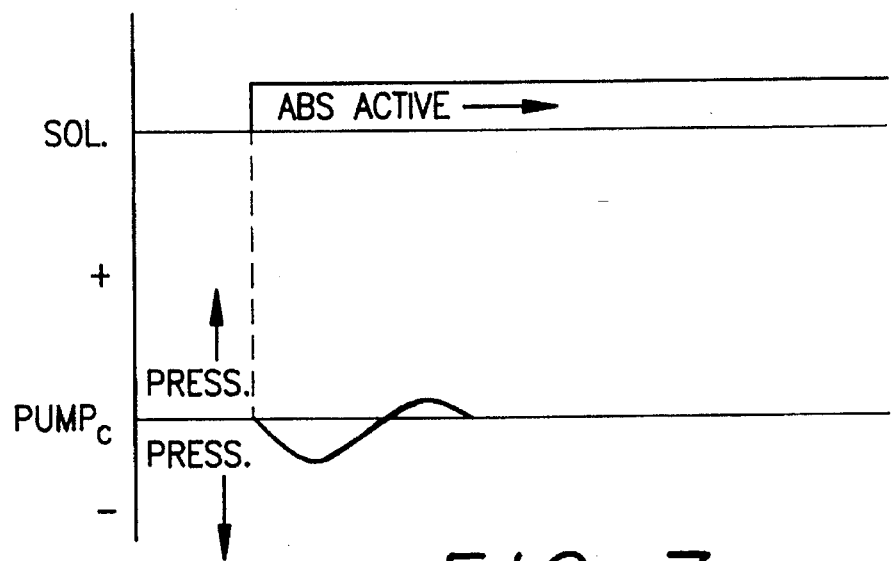
FIG. 7 is a graph showing exemplary control signals for activating a solenoid and pump in a braking channel.

An exemplary diagram illustrating the one to one correspondence between a reversible motor command signal for driving a hydraulic pump and the error signal generated by the controller 29 is illustrated in FIG. 6. Further, a typical control signal as applied to a particular solenoid and motor in a given braking channel is illustrated in FIG. 7. As can be seen in FIG. 7, the use of conventional on/off signals for driving the solenoids and uni-directional pumps in a conventional ABS system is avoided in controlling the reversible pump of the present invention. This results in a much more continuous, smooth control characteristic for each of the braking channels.

For example, the pump command signal of FIG. 7 illustrates that once an ABS control mode is activated (e.g., the solenoid in a given channel is energized), a pressure decrease operation may initially occur with a magnitude of the pump control signal being proportional to the error signal. As wheel slip decreases, the pressure decrease command can be decreased. Possibly, it will be necessary to implement a pressure increase by reversing operation of the pump as shown in FIG. 7. Throughout the ABS control mode, the pump is reversibly controlled to match wheel acceleration/deceleration to vehicle acceleration/deceleration or to match wheel speed to a target vehicle speed.

In operation, when the FIG. 1 ABS is inactive, the solenoid valves 25–28 are open. The hydraulic lines 30, 34, 38 and 42 from the master cylinder 1 are thus directly connected to the wheel cylinders 13–16 through the solenoid valves 25–28 and hydraulic lines 31, 35, 39 and 43, respectively as shown in FIG. 1. At this time, the electric motors 17–20 are off such that the hydraulic pumps 21–24 remain stationary, with one end of each pump 21–24 being blocked.

When the ABS system is activated in response to command outputs from the controller 29, the solenoid valves are energized to their alternate position. The solenoid valves can be activated simultaneously (i.e., whenever one channel enters an ABS control mode, all channels enter an ABS control mode) or each channel solenoid can be individually activated. In accordance with the present invention, these valves remain energized throughout ABS activation, with the appropriate pressure being controlled at each wheel cylinder by controlling the magnitude and polarity of the motor drive signal for proper pump operation.

For example, to reduce the front right wheel brake force, solenoid valve 25 is activated and the hydraulic line 30 from master cylinder 1 is disconnected from wheel cylinder 13. Hydraulic line 31 is connected to the pump 21 through the solenoid valve 25. The pump 21 is driven by the electric motor 17 to pump fluid from the wheel cylinder 13 to the master cylinder 1, thus reducing pressure in wheel cylinder 13.

To maintain pressure at wheel cylinder 13, the controller 29 maintains solenoid valve 25 in an active position. The electric motor 17 and pump 21 remain stationary to balance pressure in the wheel cylinder 13 and to prohibit fluid flow within the right front wheel channel.

To increase pressure in wheel cylinder 13, the solenoid valve remains active and the pump 21 is driven by electric motor 17 in response to a motor command signal from the controller 29. At this time, hydraulic fluid is delivered from the master cylinder 1 to the wheel cylinder 13. Thus, hydraulic pressure at the wheel cylinder can be regulated without ongoing on/off control of the solenoid 25.

As shown more particularly in FIG. 2, the controller 29 responds to wheel speed sensors to provide wheel speed signals to the ABS command computing circuit 125. The ABS command computing circuit 125 determines wheel acceleration/deceleration signals (i.e., determines derivatives for each wheel speed signal) as well as vehicle velocity and acceleration/deceleration signals. Further, the ABS command computing circuit determines whether the ABS is to be in an active or inactive state and whether the pressure in each of the individual wheel cylinders should be reduced, held or increased. Signals from the ABS command computing circuit 125 are delivered to the motor control circuit to operate the electric motors 17–20, respectively.

Figure 3:
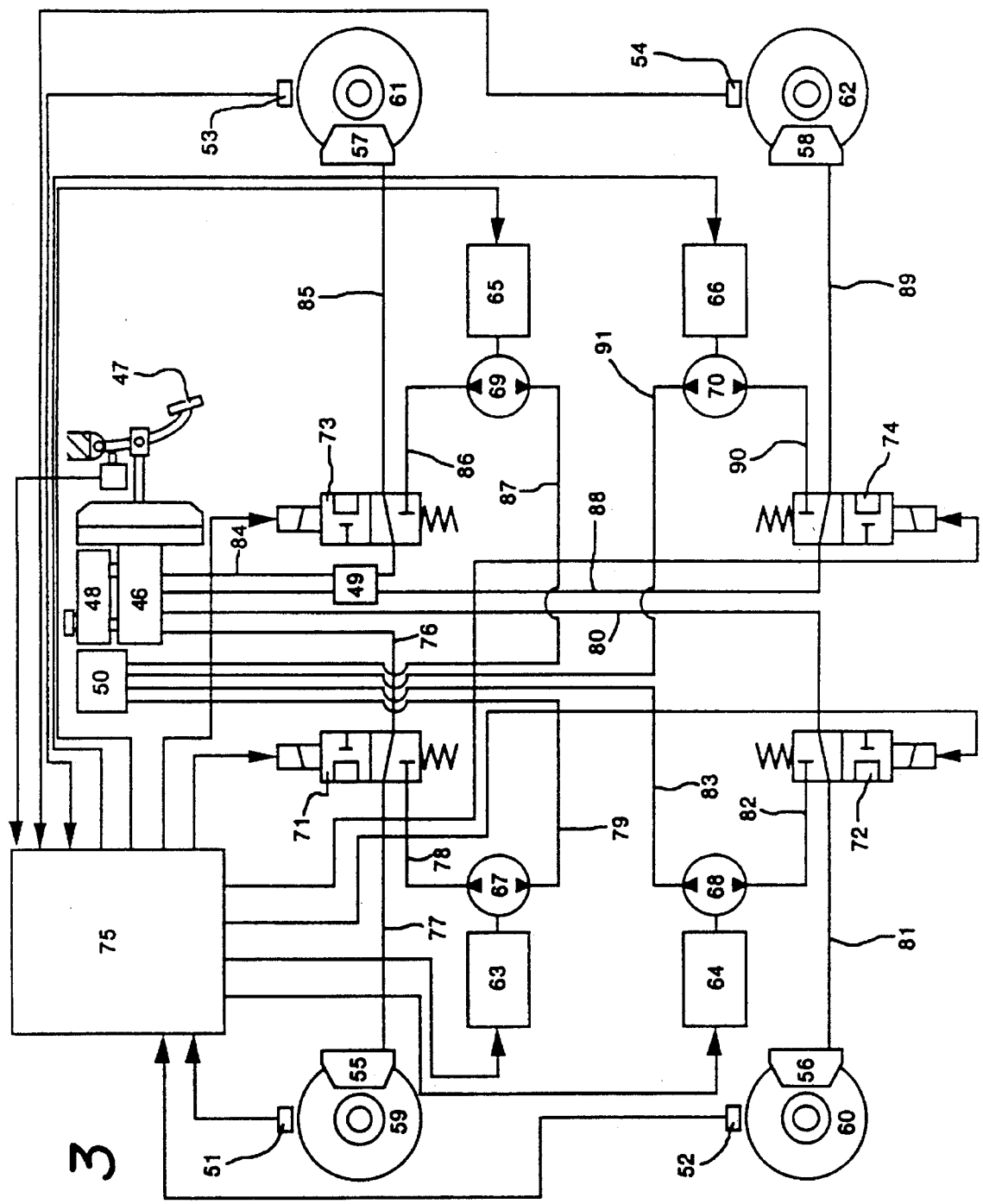
FIG. 3 is an alternate embodiment of an ABS in accordance with the present invention.

FIG. 3 is similar to the system shown in FIG. 1. In FIG. 3, a master cylinder 46, reservoir 48 and accumulator 50 respond to depression of brake pedal 47. As in the FIG. 1 system, a proportional valve 49 is also included. Further, the FIG. 3 system includes wheel speed sensors 51–54, wheel cylinders 55–58, brake wheels 59–62, electric motors 63–66, hydraulic pumps 67–70 and solenoid valves 71–74. A controller 75 similar to the controller illustrated in FIG. 2 is also included.

The one end of the hydraulic pumps 67, 68, 69, 70 are connected to the reservoir or accumulator 50 instead of the master cylinder 1. Like the FIG. 1 system, the FIG. 3 system includes hydraulic lines 76–91.

Figure 4:
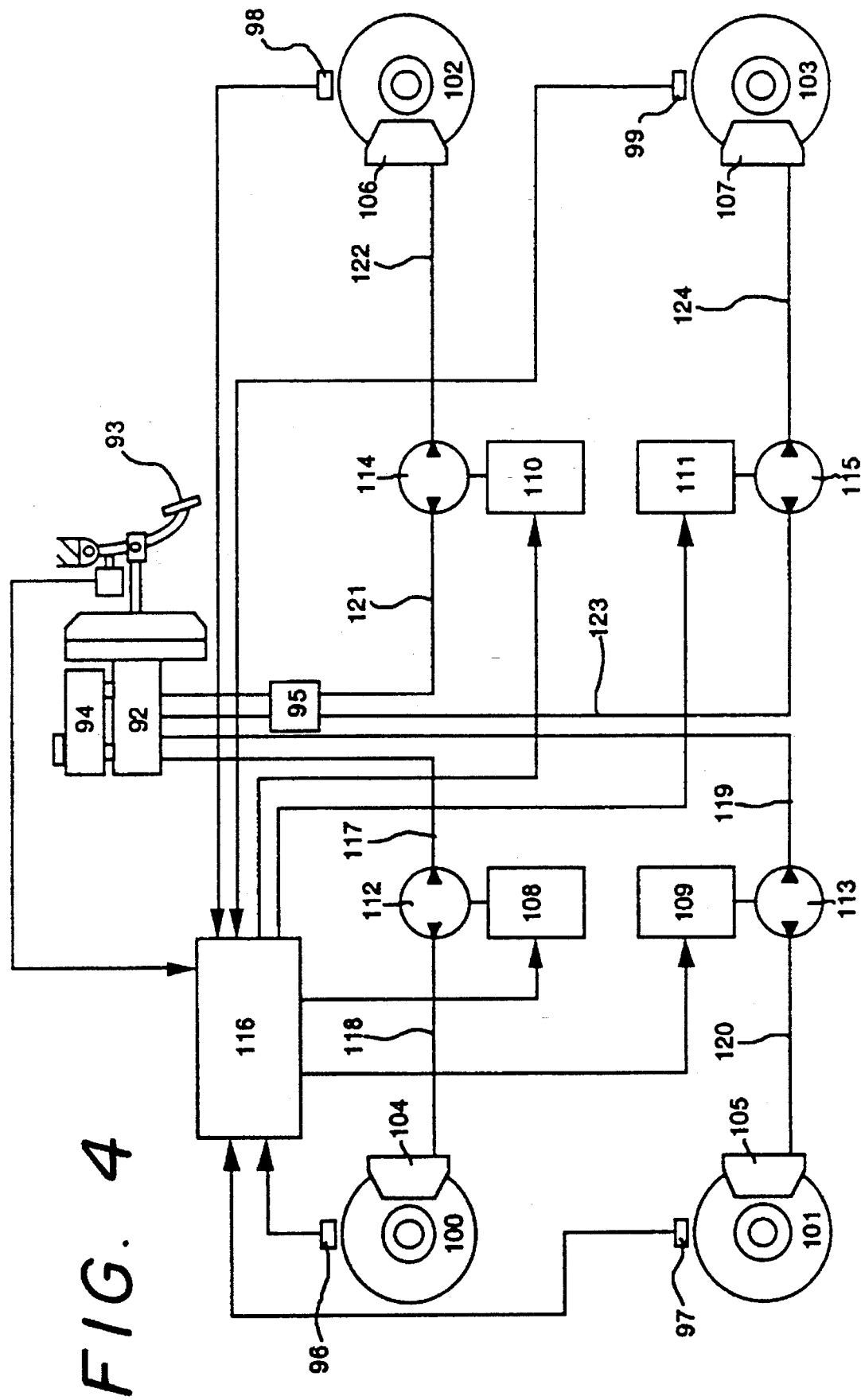
FIG. 4 is yet another alternate embodiment of an ABS in accordance with the present invention.
Figure 5:
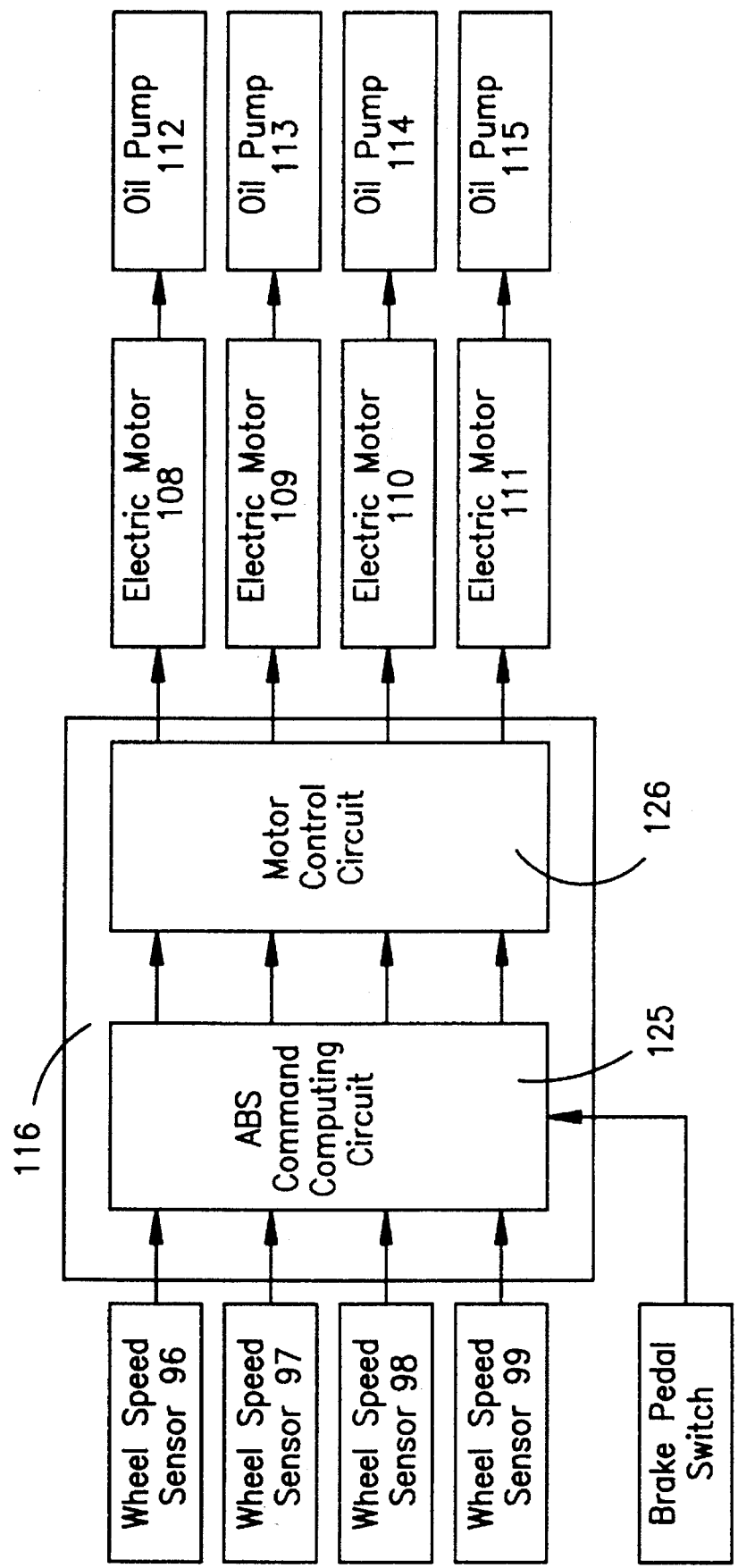
FIG. 5 is a more detailed illustration of the FIG. 4 controller.

FIG. 4 is another exemplary embodiment of a hydrostatic antilock brake system. The pumps are parallel to the main hydraulic lines in the systems on FIGS. 1 and 3. In FIG. 4, the pumps are serially connected in the main hydraulic line between a master cylinder and each respective wheel cylinder. The master cylinder 92, a reservoir 94 and a proportional valve 95 are responsive to a brake pedal 93. The FIG. 4 system further includes wheel speed sensors 96–99, brake wheels 100–103, wheel brake cylinders 104–107, electric motors 108–111, hydraulic pumps 112–115 and hydraulic lines 117–124. As in the previous embodiments, a controller 116 includes an ABS command computing circuit 125 and a motor control circuit 126, as shown in FIG. 5, which operates similarly to those of FIG. 2.

In the system shown in FIG. 4, the pumps 112, 113, 114, 115 are placed in series. The oil pumps 112, 113, 114, 115 are reversible and provide the operative capabilities described above for smoothly increasing or decreasing braking pressure in each of the braking channels.

In operation, when the pressure in the wheel cylinder 104 needs to be decreased, the pump 112 driven by the electric motor 108 rotates to pump fluid from the wheel cylinder 104 to the master cylinder 92. When the pressure in the wheel cylinder 104 needs to be held, the pump 112 does not rotate and balances the pressure. When the pressure in the wheel cylinder 104 needs to increase, the pump 112 is rotated in an opposite direction to decrease the pressure by the electric motor 108.

Although, the hydrostatic antilock brake system has been described on a 4-channel/4-sensor system, it will be appreciated that this hydrostatic ABS can be applied to the 3-channel/3-sensor system, 2-channel/3-sensor system, 2-channel/2-sensor system and 1-channel/1-sensor system. Further, although a hydraulic fluid system has been described, it will be appreciated that any fluid (e.g., air) can be used.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. Antilock brake system for a vehicle having at least one wheel, the brake system comprising:
   a hydraulic fluid source;
   hydrostatic means for providing a braking force to at least one individual wheel;
   means for sensing wheel speed of said at least one individual vehicle wheel; and
   controller means for controlling said hydrostatic braking means in response to said sensing means, said hydrostatic braking means further including:
   at least one hydraulic line connected between said hydraulic fluid source and said at least one individual wheel; and
   at least one bidirectional pump in series with said hydraulic line for controlling an amount of hydraulic fluid supplied from said hydraulic fluid source to said at least one hydraulic line through said at least one bidirectional pump in response to said sensing means.

2. Antilock brake system according to claim 1, wherein said sensing means further includes:
   wheel speed sensors placed at each wheel to detect individual wheel speed.

3. Antilock brake system according to claim 2, wherein said hydrostatic braking means further includes:
   wheel cylinders located at each of said individual wheels; and
   a master cylinder connected to said wheel cylinders via at least one solenoid valve.

4. Antilock brake system according to claim 2, wherein said controller means further includes:
   an antilock brake system command computing circuit for activating the antilock braking system to reduce, hold or increase pressure in each wheel cylinder; and
   a motor control circuit for driving said pump in response to command signals from said antilock brake system command computing circuit.

5. Antilock brake system according to claim 4, wherein said command computing circuit determines a wheel acceleration/deceleration signal for each detected wheel speed and determines vehicle acceleration/deceleration for comparison with each detected wheel speed to control said at least one bidirectional pump.

6. Antilock brake system according to claim 4, wherein said command computing circuit determines a target vehicle velocity, and compares outputs from each of said wheel speed sensors with said target vehicle velocity for controlling said at least one bidirectional pump.

7. Antilock brake system according to claim 3, further including:
   at least two hydraulic oil pumps located parallel to main hydraulic lines connected between said master cylinder and individual wheel cylinders.

8. Antilock brake system according to claim 3, further including:
   at least two braking channels, each of said braking channels having a hydraulic oil pump placed in series between said master cylinder and an individual wheel cylinder.

9. Antilock brake system according to claim 1, further including:
   at least four individual wheel speed sensors for detecting individual wheel speed in at least four independent braking channels.

10. A method for controlling an antilock brake system for a vehicle having at least one wheel, comprising the steps of:
    sensing wheel speed of at least one individual vehicle wheel;
    providing a braking force to said at least one individual wheel; and
    controlling hydrostatic braking in response to said step of sensing by activating at least one solenoid valve during an active state of the antilock brake system, said at least one solenoid being continuously actuated during an active state of the antilock brake system to control an amount of brake fluid through said at least one solenoid valve using a pump.

11. A method according to claim 10, wherein said step of controlling further includes the steps:
    determining a vehicle speed from the sensed wheel speed of said at least one individual vehicle wheel;
    comparing said sensed wheel speed of said at least one individual vehicle wheel with said determined vehicle speed; and
    activating said solenoid in response to the output of said comparison.

12. A method according to claim 11, wherein said step of controlling further includes the step of:
    determining a wheel acceleration/deceleration from said wheel speed and determining a vehicle acceleration/deceleration from said vehicle speed, and using said vehicle wheel acceleration/deceleration and said vehicle acceleration/deceleration for said step of comparing.

13. A method according to claim 12, wherein said step of controlling further includes the step of:
    activating salad pump in response to said step of comparing to either increase pressure or decrease pressure of said braking force with respect to said at least one individual wheel.

14. A method according to claim 10, wherein said step of controlling further includes a step of:
    supplying said amount of fluid from a source of brake fluid using said pump during said active state of the antilock brake system.

15. Antilock brake system for a vehicle having at least one wheel, the antilock brake system having an active mode of operation and an inactive mode of operation, the brake system comprising:
    hydrostatic means for providing a braking force to at least one individual wheel;
    means for sensing wheel speed of said at least one individual vehicle wheel; and
    controller means for controlling said hydrostatic braking means in response to said sensing means, said hydrostatic braking means further including:
    at least one two-position solenoid valve, a first position of said solenoid valve being active during a non-active antilock brake system mode for directly connecting a master cylinder to a wheel cylinder, and a second position of said two-position solenoid valve being used to connect a hydraulic pump to said at least one wheel cylinder during an active antilock brake system mode.

16. Antilock brake system according to claim 15, wherein said hydraulic pump is a reversible pump which is reversibly controlled to either increase or decrease the pressure used to provide said braking force to said at least one individual wheel.

17. Antilock brake system according to claim 15, wherein said hydraulic pump remains operably interconnected with said master cylinder during said active mode of operation to control said braking force with fluid supplied from said master cylinder during said active antilock brake system mode.

* * * * *